United States Patent

Gele

[11] 3,897,940
[45] Aug. 5, 1975

[54] LEVEL CONTROLLING SHOCK-ABSORBER

[76] Inventor: Pierre Gele, Rue du Pic, 65 Laloubere, France

[22] Filed: Jan. 28, 1974

[21] Appl. No.: 436,958

[30] Foreign Application Priority Data
Oct. 25, 1973 France .................... 73.38008

[52] U.S. Cl. .......................... 267/64 R; 267/DIG. 1
[51] Int. Cl.² ............................................. F16F 5/00
[58] Field of Search ................ 267/64 R, DIG. 1

[56] References Cited
UNITED STATES PATENTS

| | | | |
|---|---|---|---|
| 3,173,671 | 3/1965 | Broadwell | 267/64 R |
| 3,589,702 | 6/1971 | Spieth | 267/64 R |
| 3,658,313 | 4/1972 | Hahn | 267/64 R |
| 3,700,225 | 10/1972 | Fader et al. | 267/64 R |
| 3,798,744 | 3/1974 | Smith | 267/64 R |

Primary Examiner—James B. Marbert
Attorney, Agent, or Firm—Darby & Darby

[57] ABSTRACT

A level-controlling shock-absorber for automobiles of the concentric tube type wherein compressed air is admitted into the upper end of the outer tube, so as to exert through the oil filling the lower parts of both tubes a pressure on the piston rod cooperating with the inner tube, which pressure balances the load on the vehicle acting on the shock-absorber and restores thereby the level of the suspended part of the vehicle.

4 Claims, 1 Drawing Figure

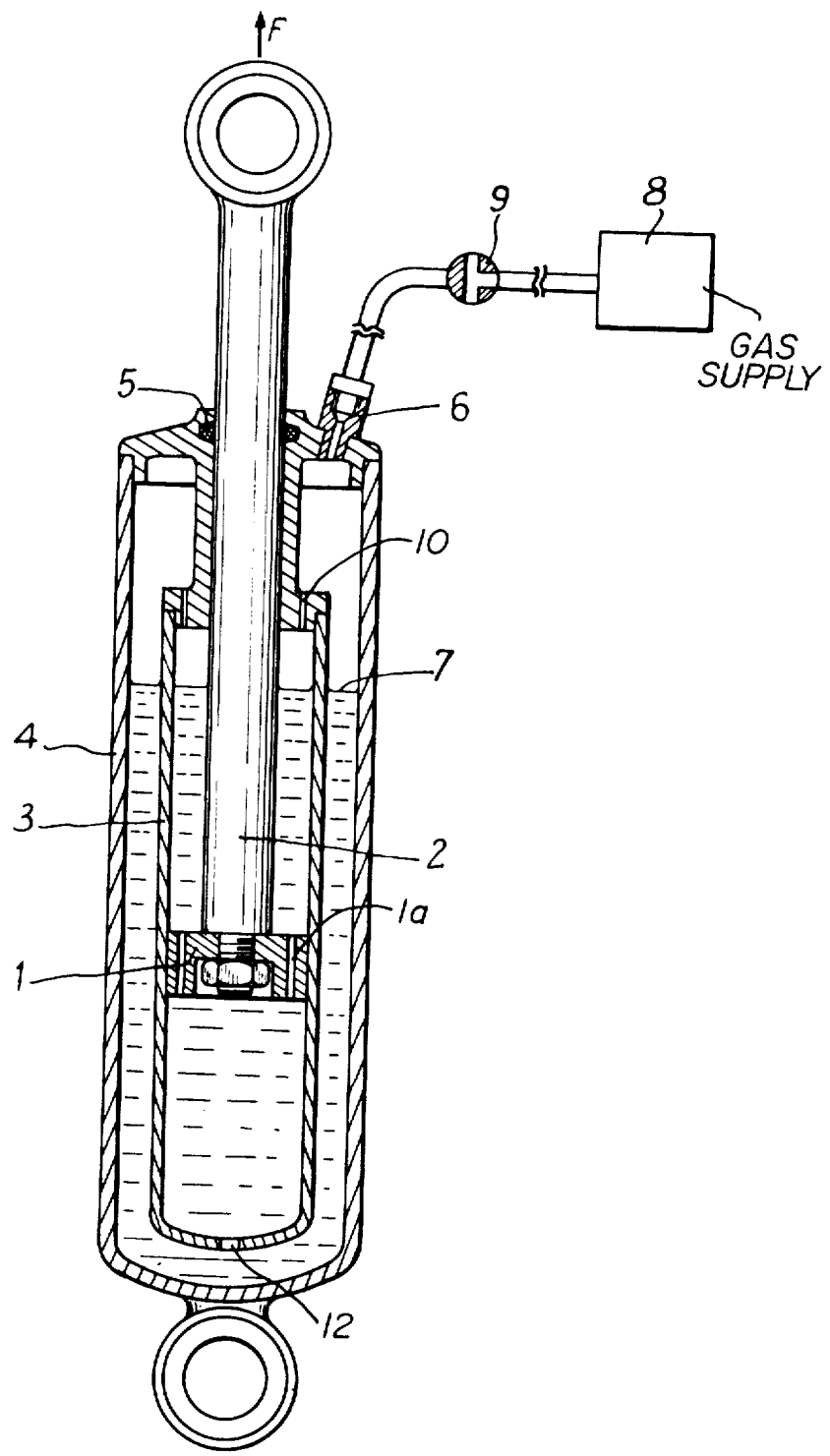

LEVEL CONTROLLING SHOCK-ABSORBER

My invention has for its object shock absorbers for automobiles and more particularly those acting as level-correcting means.

Some known shock absorbers are constituted by two coaxial tubes, of which the inner tube forms the actual operative tube inside which the piston operates while the outer tube forms a container for the hydraulic liquid.

Other known shock-absorbers comprise only one tube which is partly filled with oil and inside which the piston is adapted to move, the upper position of said tube being filled with a gas, so as to form an expansion chamber allowing the oil to expand.

It is a known fact that such a single tube shock absorber can act as level-correcting means, provided it is associated with a deformable rubber diaphragm clamped by a collar between that end of the tube through which the piston rod passes and the sleeve protecting said piston rod, the closed space thus constituted being filled with compressed air and behaving as an auxiliary suspension spring the travel of which is adjusted through adjustment of the air pressure. Such an arrangement is described in the French Pat. No. 1,382,176 in the name of Girling Limited.

However diaphragm-carrying shock absorbers of the precedingly-mentioned type show various drawbacks which have opposed up to now their practical development.

In particular, the cost of such deformable rubber diaphragms incorporating reinforcing wires in a manner similar to automobile tires, is extremely high and the assembling of the parts is a difficult matter since a high degree of fluidtightness is required.

Furthermore, the shifting of the diaphragm over the shock absorber tube and the continuous changes in diameter of said diaphragm produce frictional forces which are quite important and act detrimentally on the operation of the suspension.

My invention has for its object to remove these drawbacks and it covers a level-correcting shock absorber comprising two coaxial tubes of which the outer tube is provided at its upper end with valve-controlled connections leading to a supply of gas under a high pressure and with the outer atmosphere while the diameter of the piston rod in selected in accordance with the pressure of the supply of gas in a manner such that the thrust exerted by the hydraulic fluid on the piston rod may balance the expected load.

My improved shock absorber behaves in the manner of a hydraulic jack, the diameter of the piston of which is equal to that of the piston rod. Consequently, when the load increases and the suspended part sinks, it is sufficient to open the connection between the shock absorber and the supply of gas under a high pressure and to thereby increase the pressure inside the shock absorber, so as to make the vehicle return into its normal position, following which said connection is closed again.

By way of example, I may mention that in a typical shock absorber according to my invention the piston rod of which has a diameter of 18 mm. corresponds to a jack the piston area of which measures 2.54 sq. cm. and which when fed under a pressure of 30 bars produces a thrust of substantially 76 kgs.

A similar shock absorber the end of which has a diameter of 30 mm, that is a cross-sectional area of 7.06 sq. cm. produces a thrust of 282 kgs under a pressure of 40 bars.

It is apparent that it is a very easy matter for a designer to obtain a perfect correction of the position of the vehicle body, whatever the type of the vehicle to be equipped may be, whether a small and light car or a truck which is to convey heavy loads.

It has also been noticed that the emulsion produced by the air and oil mixture inside the shock absorber is detrimental to its proper operation. As a matter of fact, the valve and various braking sections in the path of the fluid produce losses of head which are different for air and for oil by reason of the considerable physical differences between said fluids which are respectively highly compressible and practically non-compressible under the pressure conditions to be considered.

The differences in viscosity are also quite important and a shock-absorber should be designed for a constant braking of the oscillation of a suspension. As soon as some air is present in the oil, a defective braking is noticeable, together with a cavitation phenomena ascribable to the sudden reduction in pressure of the highly compressed air in the air-locks which air expands immediately after the piston has passed or the air has escaped through the valves.

With the arrangement of the subject invention, the operation of the shock-absorber is much steadier and the volume of the air-lock subjected to a high pressure decreases to a substantial extent. Consequently, the vehicle runs much more smoothly and uniformly whatever the changes in temperature may be.

Care should however be exercised as concerns the packing through which the rod slides. The shape of said packing should be such that the increase in pressure cannot produce further frictional forces on the rod. To this end, it is possible to resort to packings having a quadrangular cross-section or to packing with narrow lips, which types of packings are well-known in the construction of jacks.

The accompanying drawing illustrates by way of example an embodiment of a shock absorber according to the invention.

The single FIGURE of said drawing is a diagrammatic cross-sectional view of the shock-absorber.

As illustrated, the piston 1 carried by the rod 2 slides inside an operative inner cylinder or tube 3 provided with ports or with flap valves, not illustrated, which produce a loss of energy through lamination of the oil. The piston 1 has a number of ports, or passages 1a therein so that during displacement of the piston there can be communication of the oil from the portions of the tube above and below the piston. This aids in damping and smoothing the action of the shock absorber. The outer tube 4 carries at its upper end a sleeve surrounding the piston rod 2 and rigid with the inner cylinder or tube 3, said sleeve including a packing surrounding the piston rod 2. A connection 6 opening into the upper end of the outer tube 4 is adapted to feed the latter with compressed air or other suitable gas form fluid consistent with the proper operation of the shock absorber. Said connection 6 is connected with a supply 8 of the gas under a high pressure through a three-way valve 9 which serves also for connecting the inside of the tube 4 with the atmosphere. The oil level in the tubes is shown at 7. The neck of the sleeve 5 through which the piston rod passes has a number of ports 10 which provide communication with both the compressed gas and the oil to the upper part of the tube. Furthermore, this ensures the equalization of the pressure in both the inner and the outer tubes.

The operation of the arrangement is as follows: the shock absorber is initially adjusted for a zero load of the vehicle and when the latter is loaded, the piston 1 sinks inside the inner tube 3 and assumes a different position of equilibrium. An opening 12 (or a known laminating valve) is provided at the lower end of the inner tube 3 so that there is communication between the oil in the outer and the inner tubes. The movement of piston 1 downwardly, for example, causes oil to move through the opening 12 into the outer tube, the gas pressure being the same in the inner and outer tubes due to opening 10. The position of the vehicle body is modified and its level above ground is reduced. The operator acts then on the valve 9, so as to feed the shock absorber with highly compressed gas whereupon said shock absorber returns slowly into its original position. The valve 9 may then be closed. When the load decreases, the operator sets the valve 9 in the position opening the connection 6 into the atmosphere whereby the shock absorber returns into the condition corresponding to a proper level for the vehicle body.

Of course, the operation of the valve 9 or of the like means connecting the shock absorber with the supply 8 or with the atmosphere can be controlled by an arrangement measuring the modifications in the level of the vehicle body. The shock absorber according to the invention forms thus an automatic level-correcting device.

I claim:

1. A level-correcting shock-absorber for vehicles of the type having a suspended and non-suspended part and associated with a supply of compressed gas, comprising an outer oil-filled tube provided at its upper end with a depending axially bored sleeve, an inner tube carried by the lower end of said sleeve and including a passageway for the oil from the outer tube into the inner tube, a piston slidingly carried inside the inner tube, a piston rod carrying said piston extending through the outer tube and the axial bore in the sleeve, means for selectively connecting the upper end of the inside of the outer tube above the oil level therein with the supply of compressed gas, means adapted for pivotally connecting the piston rod and the outer tube respectively with the two parts of the vehicle, the pressure transmitted through the oil to the piston rod balancing the load on the vehicle.

2. A shock-absorber as in claim 1, wherein said means for connecting the supply of compressed gas includes a three-way valve adapted to connect the upper end of the inside of the outer tube selectively with the supply of compressed gas and with the atmosphere.

3. A shock absorber as in claim 1, comprising means defining the level of the vehicle body above ground and controlling the valve system.

4. A shock absorber as in claim 1 wherein said piston includes at least one port.

* * * * *